United States Patent [19]
Holtgreven et al.

[11] Patent Number: 4,733,736
[45] Date of Patent: Mar. 29, 1988

[54] LOAD CELL ASSEMBLY

[75] Inventors: Mark S. Holtgreven; Leonard T. Holtgreven, both of Findlay, Ohio

[73] Assignee: Holtgreven Scale and Electronics Corporation, Findlay, Ohio

[21] Appl. No.: 80,770

[22] Filed: Aug. 3, 1987

[51] Int. Cl.$^4$ .................. G01G 21/24; G01G 3/14
[52] U.S. Cl. .................. 177/255; 177/DIG. 9; 177/211
[58] Field of Search .............. 177/255, DIG. 9, 211

[56] References Cited

U.S. PATENT DOCUMENTS

| | | | |
|---|---|---|---|
| 4,280,576 | 7/1981 | Smith, Jr. | 177/DIG. 9 |
| 4,475,610 | 10/1984 | Schwarzschild | 177/255 X |
| 4,609,062 | 9/1986 | Hale et al. | 177/DIG. 9 |
| 4,627,507 | 12/1986 | Powell et al. | 177/255 X |

*Primary Examiner*—George H. Miller, Jr.
*Attorney, Agent, or Firm*—Willian Brinks Olds Hofer Gilson & Lione

[57] ABSTRACT

A load cell assembly for a vehicle scales and other weighing applications includes a load cell configured to weigh in tension and substantially eliminate sensitivity to transversely and obliquely directed forces includes upper and lower alignment assemblies. Each alignment assembly includes three members: an intermediate member having an upper and lower pair of aligned curved pivots disposed perpendicularly to one another and received within aligned, curved channels in adjacent upper and lower members. The lower member of the upper assembly supports the entire load cell assembly and the upper member of the lower assembly supports the scale platform. Extending between the upper member of the upper assembly and the lower member of the lower assembly is a load cell which is placed in tension to measure the load applied to the assembly. Pivoting motion and readjustment of the load cell assembly in response to transverse and obliquely directed forces renders the load cell substantially insensitive to all but vertically directed loads.

19 Claims, 5 Drawing Figures

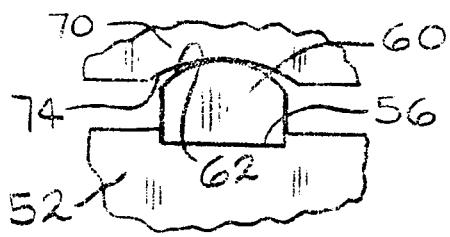
FIG. 5
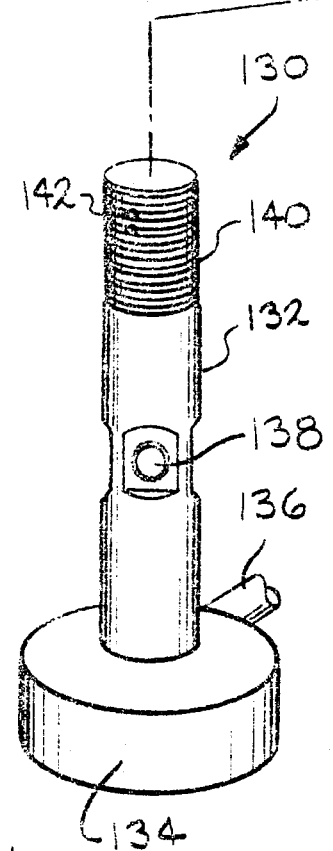
FIG. 4
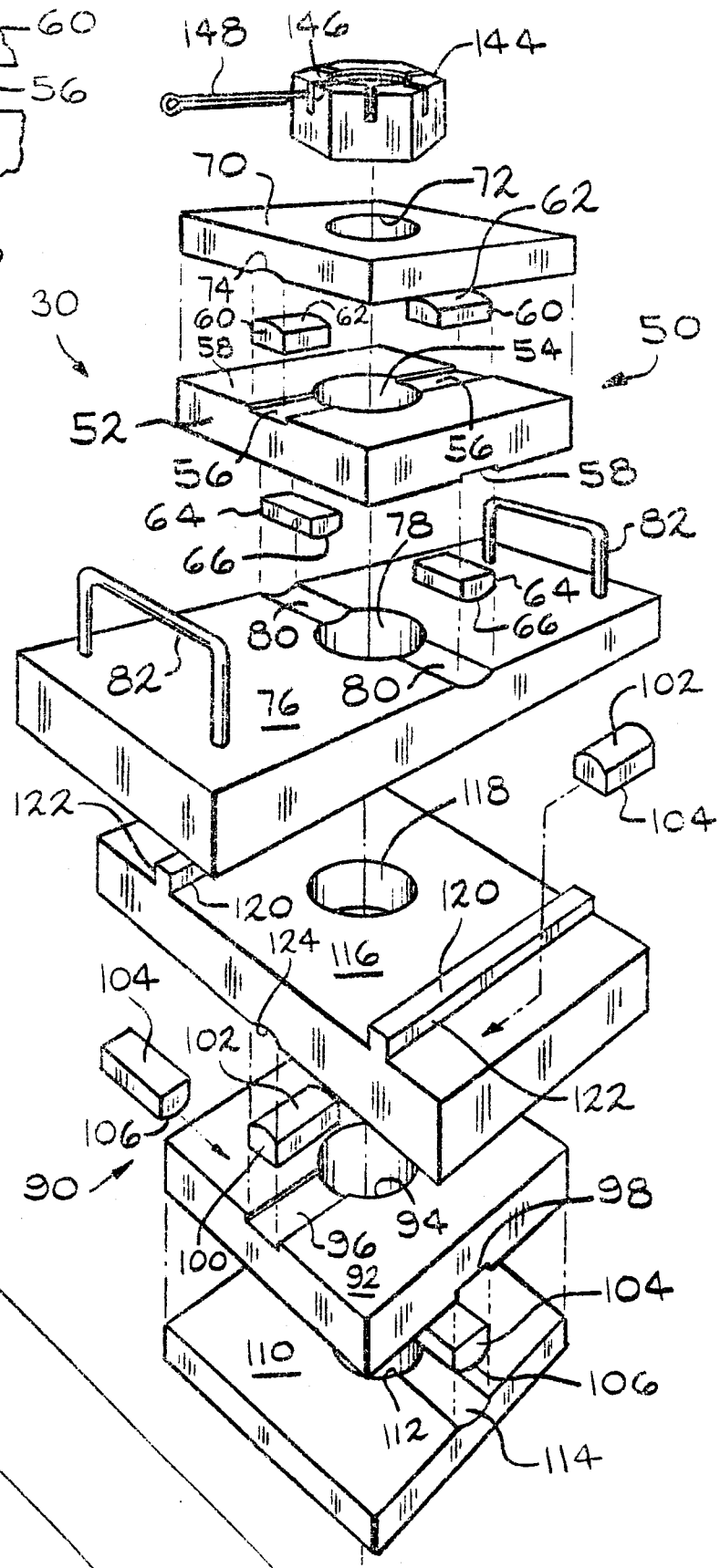

LOAD CELL ASSEMBLY

BACKGROUND OF THE INVENTION

The invention relates generally to load measuring apparatus and more specifically to a load measuring apparatus incorporating a load cell and a plurality of interleaved plates and pivots which eliminate sensitivity to transverse forces and ensure accurate load measurement in vehicle scales and similar applications.

Weight measurement of vehicles to ensure that they are not in violation of prescribed highway load limits, to measure the amount of bulk goods charged and delivered by a vendor or both requires scales that have not only an exceptionally large capacity but which are also exceptionally accurate. In the last several decades, the technology of vehicle weighing apparatus has shifted from modified and complex balance beam type mechanisms to multiple load cell configurations in which multiple measurements are appropriately summed and provided by electronic components. U.S. Pat. Nos. 3,266,584 to Lee, 3,533,481 to Paelian, 3,831,441 to Petty and 4,281,728 to Dickason et al. present various weighing devices utilizing load cells.

One of the concerns often addressed in the prior art relating to large scales such as truck scales is an unwanted and undesirable sensitivity to loads and forces directed in anything other than a purely vertical direction. Such sensitivity results from oblique forces that, through the scale platform suspension system, resolve into a vertical and horizontal component, the vertical component either subtracting from or more commonly adding to the actual vehicle weight. The problem, of course, is not unique to large vehicle scales but due to the size of the platform and the unavoidability of utilizing multiple point suspension configurations, the problem is much more significant than in smaller weighing apparatus of lesser capacity.

U.S. Pat. No. 2,793,851 to Ruge discloses an early load cell assembly which addresses this problem. It includes spherical upper and lower ends on the load sensing and transfer members which are intended to cause it to align with and respond only to vertically directed loads. This same problem is addressed in U.S. Pat. No. 3,407,891 to Weigand wherein a compression type load cell and its associated load transfer member include a plurality of pairs of curved surfaces and complementary engaging members which likewise are intended to eliminate measurement of transverse forces by rendering the associated load cell insensitive to them.

U.S. Pat. No. 4,248,317 to Rahav discloses another load cell assembly wherein curved upper and lower surfaces are intended to permit movement and alignment of the load cell along the vertical force line and thereby render it insensitive to horizontal or oblique forces.

U.S. Pat. No. 4,627,507 to Powell et al. teaches a load cell assembly wherein the load cell is placed in compression. The load cell senses the weight which is transferred through a pair of parallel links which are loaded by pairs of upper and lower parallel pins. Here, too, the intention it to render the load cell insensitive to loads directed along other than vertical lines of action.

As noted, several of the foregoing patents disclose weighing apparatus wherein the load cell is placed in compression to weigh a vehicle or other object. However, it is generally acknowledged that such operational mode is more sensitive to the concomitant undesirable measurement of transverse and oblique forces. The alternative comprehends placing the load carrying members and specifically the load cells in tension. However, the mechanical components of such an arrangement are generally more complex than a weighing platform which places the load cells in compression. Furthermore, the vertical height of such a platform is generally greater than that of a platform which weighs and operates in compression. Thus, it is apparent that improvements directed to vehicle and platform scales which weigh with load cells placed in tension, which are insensitive to oblique loads and forces and which occupy only minimal vertical distances are not only desirable but also possible.

SUMMARY OF THE INVENTION

The present invention relates to a load cell assembly for vehicle scales and other high capacity platform type weighing apparatus. A typical scale includes a plurality of load cell assemblies configured to weigh in tension which preferably include a pair of substantially identical upper and lower alignment assemblies. Each alignment assembly includes three members: an intermediate member having an upper pair of spaced apart aligned curved pivot members and a lower pair of spaced apart aligned curved pivot members disposed perpendicularly to the upper pair of aligned curved pivot members. The upper pivot members are received within arcuately curved grooves in an upper member and the lower pair of curved pivot members are received within arcuately curved aligned grooves in a lower member. The lower member of the upper alignment assembly supports the entire load cell assembly and the upper member of the lower alignment assembly supports and receives the weight of the scale platform. Extending between the upper member of the upper alignment assembly and the lower member of the lower alignment assembly is a load cell which is placed in tension to measure the load applied to the assembly. Mechanically, the load cell appears similar to a bolt and includes a head at one end and threads on the opposite end which receive a complementarily threaded nut. Disposed generally in the middle of the load cell are strain gauges which function in a conventional fashion to provide an indication of the strain which the load cell assembly is undergoing and thus the weight which it is carrying. The upper and lower alignment assemblies facilitate movement of the load cell into parallel alignment with vertical forces thereby providing accurate weighing of the load by substantially eliminating sensitivity to and measurement of transverse or obliquely directed forces.

Thus it is an object of the present invention to provide a load cell assembly which will be utilized with other, identical load cell assemblies to provide weight measurement in a platform scale.

It is a further object of the present invention to provide a load cell assembly which weighs in tension.

It is a still further object of the present invention to provide a load cell assembly which is substantially insensitive to transverse and obliquely directed loads.

It is a still further object of the present invention to provide a load cell assembly wherein substantially identical upper and lower alignment assemblies associated with one load cell substantially eliminate sensitivity to oblique and transverse forces to provide highly accurate measurement of vertical forces and thus the weight of a vehicle or other object on the scale platform.

BRIEF DESCRIPTION OF THE DRAWINGS

FIG. 4 is an exploded perspective view of a load cell assembly according to the present invention; and FIG. 5 is a fragmentary, side elevational view of a pivot member of the load cell assembly according to the present invention.

DESCRIPTION OF THE PREFERRED EMBODIMENT

Figure 1:
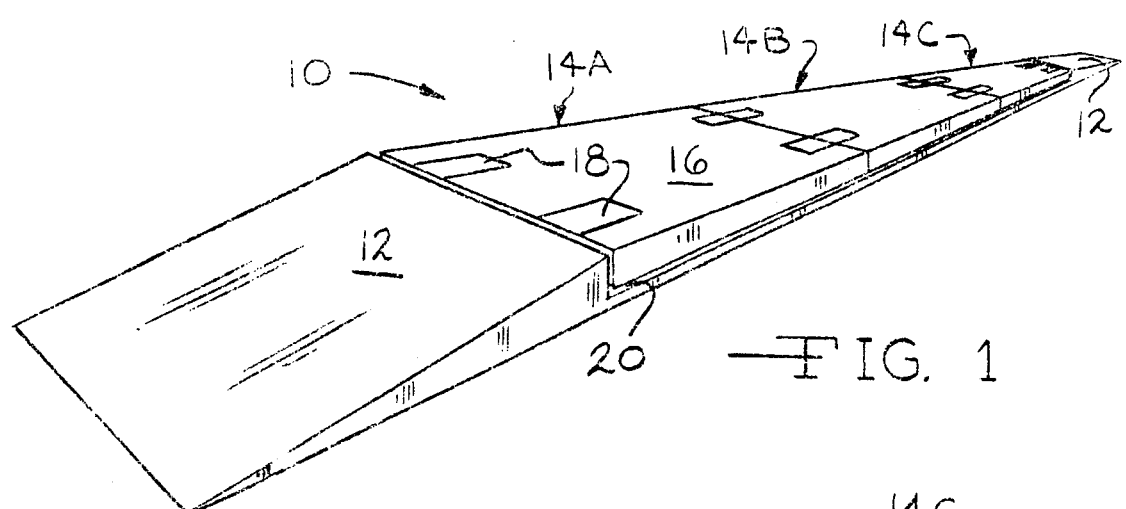
FIG. 1 is a perspective view of a multiple section scale for weighing vehicles and the like according to the present invention.

Referring to FIG. 1, a platform scale incorporating load cell assemblies according to the present invention, is illustrated and generally designated by the reference numeral 10. The platform scale 10 illustrated is a configuration generally designated above ground, pitless or surface mounted. For purposes of example, illustration and improved clarity, this above ground configuration is presented herein. However, it should be understood and appreciated that the load cell assembly of the present invention is equally adaptable to and suited for in ground or pit type scale installations inasmuch as the scale components to which the invention relates are wholly compatible with either type of scale. Similarly, the present invention may be and is intended for utilization in a broad variety of weighing, testing and calibration equipment.

The platform scale 10 includes a pair of opposed ramps 12 which provide access for motor vehicles to the platforms 14A, 14B and 14C of the platform scale 10. It will be appreciated that if the scale 10 is a pit type scale, the ramps 12 may be eliminated inasmuch as the surface of the platforms 14A, 14B and 14C will be substantially flush with the surrounding terrain. Three platforms 14A, 14B and 14C have been illustrated in FIG. 1. However, the precise number of platforms utilized in a given scale installation will depend upon both the maximum length of the vehicle and, correspondingly, the load capacity of the platform scale 10. Thus, although three scale platforms 14A, 14B and 14C have been illustrated, the actual number of platforms utilized in a given installation is a matter of engineering choice. Therefore, platform scale installations utilizing a single platform or several platforms are considered to be within the purview of the present invention.

Each of the scale platforms 14A, 14B and 14C includes a substantially continuous upper surface 16 which may be formed of steel plates, concrete or other suitable durable material. Appropriately positioned on the upper surface 16 of the platforms 14A, 14B and 14C and forming a portion of the continuous upper surface 16 are a plurality of access plates 18. The access plates 18 are preferably steel and are fabricated and sized such that they are removably received within complementary openings in the upper surface 16 of the platforms 14A, 14B and 14C such that they may be readily manually removed and replaced as desired. The scale platforms 14A, 14B and 14C and associated components of either an above ground or pit mounted platform scale 10 are preferably supported upon a horizontal surface, slab or floor 20. The horizontal floor 20 is preferably fabricated of concrete or other suitable durable material.

Figure 2:
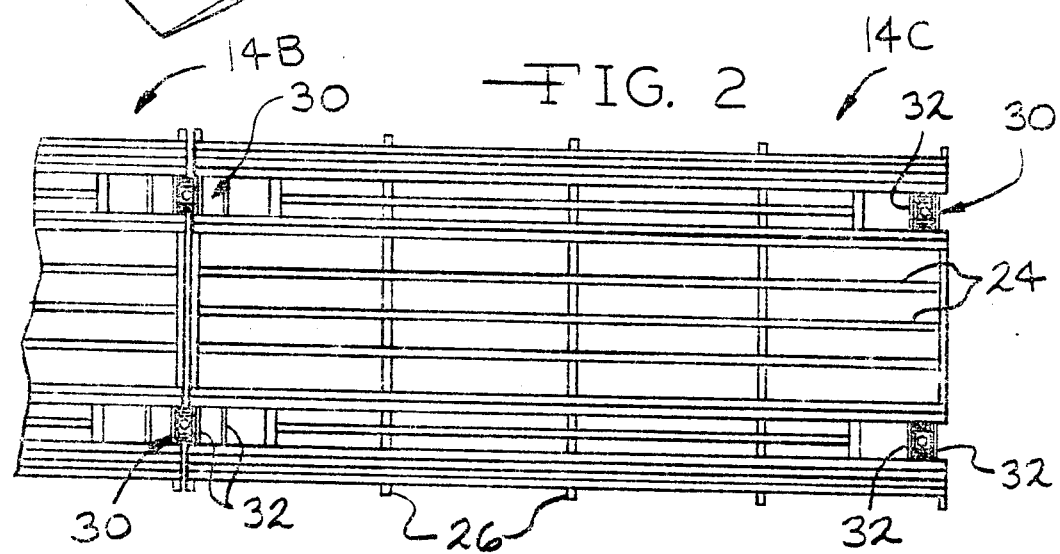
FIG. 2 is a fragmentary, top plan view of a portion of a scale platform according to the present invention.

Referring now to FIG. 2, the platform 14C at the right end of a platform scale 10 and a portion of the platform 14B in the middle of the scale 10 are illustrated in top plan view with the upper surface 16 and the access plates 18 removed. Each of the platforms 14A, 14B and 14C include a plurality of spaced-apart, parallel, longitudinally oriented I-beams 24 coupled by suitable fastening means such as welding, rivets and the like to a plurality of spaced-apart, parallel, transversely oriented I-beams 26. The precise number of longitudinal and transverse I-beams, 24 and 26, respectively, as well as their spacing and size, are matters of engineering design. Basically, as readily appreciated, the foregoing parameters will be adjusted to provide a substantially rigid and durable frame for the platforms 14A, 14B and 14C in accordance with conventional truss and scale platform design. At two locations at each end of each of the platforms 14A, 14B and 14C, in areas corresponding with and directly beneath the access plates 18, are disposed load cell assemblies 30. Preferably, four load cell assemblies 30 are utilized with each platform 14A, 14B and 14C and they are thus disposed generally adjacent the corners of the platforms 14A, 14B and 14C. The utilization of more or fewer load cell assemblies 30 with a given platform configuration or size, is, however, deemed to be within the purview of the present invention.

Figure 3:
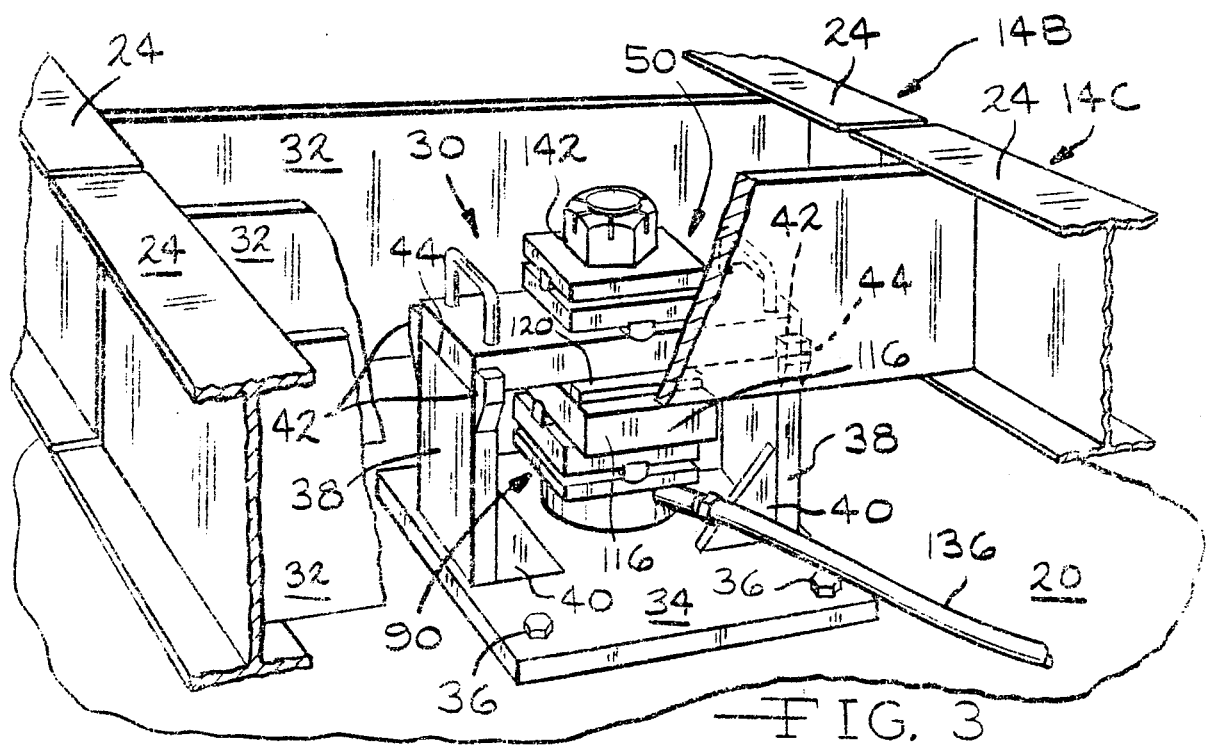
FIG. 3 is a fragmentary, perspective view of a portion of a scale platform and load cell assembly according to the present invention.

Referring now to FIGS. 2 and 3, it will be appreciated that adjacent the load cell assemblies 30 at each corner of the scale platforms 14A, 14B and 14C and secured by suitable means such as welding or rivets to the longitudinal I-beams 24 are a pair of transversely disposed load beams 32. The longitudinal distance between the pair of load beams 32 is preferably a preselected and fixed distance which is uniform at all corner locations of all of the platforms 14A, 14B and 14C. The longitudinal distance between the load beams 32 is such that they are received upon and supported by the load cell assemblies 30 as illustrated to the right in FIG. 2. This uniform distance is preferably also the longitudinal distance between the end-most load beam 32 of adjacent platforms, that is, the distance between a load beam 32 on the end of, for example, the platform 14B and the load beam 32 spaced from it on the adjacent platform 14C. Thus, adjacent load beams 32 of adjacent platforms such as the platforms 14B and 14C likewise are received upon and supported by the load cell assemblies 30, such as those illustrated to the left in FIG. 2. The positioning and spacing of the load beams 32 as described immediately above facilitates the use of a single, standardized load cell assembly 30 to support the ends of a platform such as the platform 14C, as illustrated to the right in FIG. 2, or both ends of adjacent platforms, such as the platforms 14B and 14C, as illustrated to the left in FIG. 2.

Each of the load cell assemblies 30 includes a mounting plate 34. Preferably, the load cell assemblies 30, and specifically the mounting plates 34, are secured to the slab or floor 20 by suitable fasteners 36. Disposed in spaced-apart relationship adjacent parallel edges of the mounting plate 34 are a pair of parallel support yokes 38. The yokes 38 may be secured to the mounting plate 34 by welding or other suitable fastening means and preferably are reinforced with gussets 40 which may likewise be welded to the adjacent components. Each of the support yokes 38 includes a pair of spaced-apart vertically extending lugs or ears 42 adjacent their upper termini. Between each of the pairs of lugs or ears 42 is a horizontal surface 44. The horizontal surface 44 bounded by the ears 42 removably receives other components of the load cell assembly 30 and inhibits longitudinal motion of these components, that is, motion parallel to the longitudinal I-beams 24. Thus, the other components of the load cell assembly 30 may be readily removed from the support yokes 38 and inspected, calibrated or serviced if necessary. The access plates 18, illustrated in FIG. 1, disposed directly above the load cell assemblies 30 facilitate such servicing.

Referring now to FIGS. 3, 4 and 5, the load cell assembly 30 further includes a first or upper alignment assembly 50 and a second or lower alignment assembly 90. Although the first, upper alignment assembly 50 is substantially identical to the second, lower alignment assembly 90, as will be more fully understood after complete descriptions thereof, the two assemblies 50 and 90 will be described separately in order to fully delineate their elements and enhance appreciation of both their similarities and differences.

The first, upper alignment assembly 50 includes an intermediate member or plate 52 having a centrally disposed through passageway 54. Aligned with one another as well as with lines of radius of the passageway 54 are a pair of slots or channels 56 which are cast, milled or otherwise formed in the upper surface of the intermediate plate 52. Oriented at a right angle to the first pair of channels 56 in the upper surface of the intermediate plate 52 are a second pair of aligned slots or channels 58 which are likewise disposed along lines of radius of the passageway 54 and which are cast, milled or otherwise formed in the lower surface of the intermediate plate 58. A first pair of pivot members 60 having upwardly directed curved surfaces 62 of a given radius are received within the first pair of aligned channels 56. A second pair of pivot members 64 are likewise received within the second pair of channels 58 and define downwardly facing curved surfaces 66. A suitable radius for the curved surfaces 62 and 66 is 1.00 inch. It should be understood that the pairs of pivot members 60 and 64 may be integrally formed with the intermediate plate 52, if desired. From a service and repair perspective, however, it has been found preferable to utilize separate components, as described.

The first, upper alignment assembly 50 further includes an upper member or plate 70 which may be the same width and depth as the intermediate plate 52. The upper plate 70 likewise defines a centrally disposed through aperture 72 of a diameter preferably equal to the passageway 54 in the intermediate plate 52. On the lower surface of the upper plate 70 and oriented in alignment with one another as well as with lines of radius from the passageway 72 are a pair of arcuately curved grooves 74. The grooves 74 have a radius greater than the radius of the curved surfaces 62 of the pivot members 60 which engage them. If, as suggested, the radius of the curved surfaces 62 is 1.00 inch, the radius of the grooves 74 is preferably 1.25 inches. If the radius of the curved surfaces 62 is larger or smaller, the preferred ratio between the radius of the curved surfaces 62 and the radius of the curved grooves 74 is 1.00 to 1.125 and an operable range of ratios is from 1.00:1.10 to 1.00:2.00.

Finally, the upper alignment assembly 50 includes a lower member or plate 76 which is elongate. The lower plate 76 is received within the ears 42 of the support yokes 38 and rests upon and is supported by the horizontal surfaces 44. The elongate lower plate 76 defines a centrally disposed through passageway 78 preferably having a diameter equal to the diameter of the through passageways 54 and 72. The upper surface of the lower plate 76 defines a pair of aligned arcuately curved grooves 80 which are also aligned with lines of radius of the passageway 78. In order to assist removal of the components of the load cell assembly 30 illustrated in FIG. 4 from the support yokes 38, the elongate lower plate 76 of the upper alignment assembly 50 preferably includes a pair of U-shaped handles 82.

The second, lower alignment assembly 90 includes an intermediate member or plate 92 having a centrally disposed through passageway 94 which is preferably the same diameter as the through passageways 54, 72 and 78. The intermediate plate 92 is in all respects identical to the intermediate plate 52 of the upper alignment assembly 50. As such, it includes a first pair of slots or channels 96 which are cast, milled or otherwise formed in the upper surface of the intermediate plate 92 in alignment with one another as well as in alignment with lines of radius of the passageway 94. Oriented at a right angle to the first pair of slots or channels 96 on the upper surface of the intermediate plate 92 are a second pair of aligned slots or channels 98 which are cast, milled or otherwise formed in the lower surface of the intermediate plate 98 along lines of radius of the passageway 94. A first pair of pivot members 100 having upwardly directed curved surfaces 102 of a given radius are received within the first pair of aligned channels 96 and a second pair of pivot members 104 having downwardly directed curved surfaces 106 are likewise received within the second pair of channels 98. A suitable dimension for the radius of the curved surfaces 102 and 106, as noted above, is 1.00 inch.

The second, lower alignment assembly 90 further includes a lower member or plate 110 which may be the same width and depth as the intermediate plate 92. The lower plate 110 is in all respects identical to the upper member or plate 70 of the first alignment assembly 50 and thus likewise defines a centrally disposed through passageway 112 of a diameter preferably equal to the passageway 94 in the intermediate member or plate 92. On the upper surface of the lower plate 110 and oriented in alignment with one another as well as with lines of radius of the through passageway 112 are a pair of arcuately curved grooves 114. The grooves 114 have a radius greater than the radius of the curved surfaces 106 which engage them. If the radius of the curved surfaces 106 is 1.00 inch, as suggested above, a suitable complementary radius for the grooves 114 is 1.125 inches.

Finally, the second, lower alignment assembly 90 includes an elongate upper member or plate 116. The elongate upper plate 116 defines a centrally disposed through passageway 118 preferably having a diameter equal to the diameters of the through passageways 94 and 112. Disposed on the upper surface of the elongate upper plate 116 are a pair of parallel, spaced-apart centering bars 120. The centering bars 120 are disposed transversely on the elongate upper plate 116 and at equal distances from the through passageway 118. The centering bars 120 may be secured to the upper plate 116 by welding or other suitable means or may be integrally formed with or milled into the elongate plate 116, if desired. The outside vertical surfaces 122 of the bars 120 are separated by a horizontal distance slightly less than the distance between the inside surfaces of the load beams 32 (illustrated in FIG. 3). Thus, the centering bars 120 ensure that the beams 32 engage and seat upon the upper surface of the elongate plate 116 at equal distances from the through passageway 118 in order to uniformly apply weight thereto. The lower surface of the upper plate 116 defines a pair of aligned arcuately curved grooves 124 which are also aligned with lines of radius of the passageway 118. The grooves 124 have a radius greater than the radius of the curved surfaces 102 which engage them. If the radius of the curved surfaces 102 is 1.00 inch, as suggested above, a suitable complementary radius for the grooves 124 is 1.125 inches.

The through passageways 54, 72, 78, 94, 112 and 118 are disposed in coaxial alignment when the first, upper alignment assembly 50 and the second, lower alignment assembly 90 are assembled. Extending through the just recited passageways is a load cell 130 which includes an elongate cylinder 132 having a diameter less than the diameters of the through passageways 54, 72, 78, 94, 112 and 118 such that it may readily and loosely pass therethrough. The load cell 130 also has an enlarged diameter head 134 to which a cable 136 is secured. The cable 136 encloses various conductors (not illustrated) which carry the electrical signals from strain gauges 138 to the associated electronic equipment (not illustrated) which forms no portion of the present invention. At the opposite end of the elongate cylinder 132 is disposed a region of threads 140 which extend beyond the upper surface of the upper member or plate 70 when the load cell assembly 30 is assembled. A radial bore 142 extends through the load cell 130 in the region of the threads 140. A nut 144 having radially aligned and axially extending slots 146 for receipt of a locking pin such as a cotter pin 148 may be threaded upon the threads 140 to secure the load cell 130 within the load cell assembly 30 as well as maintain the components of the first alignment assembly 50 and second alignment assembly 90 in proper operating and cooperating positions as illustrated in FIG. 3.

In order to enhance understanding of the load cell assembly 30 according to the present invention, the following brief discussion of its features and operation will be presented. First of all, it should be appreciated that the stack of components illustrated in FIG. 4, which are shown assembled in FIG. 3, are loosely so assembled. That is, operation of the load cell assembly 30 according to the present invention depends upon and presumes motion and repositioning of the components of the upper alignment assembly 50 and lower alignment assembly 90 about the axes defined by the various cooperating pivot members 60, 64, 100 and 104 and the grooves 74, 80, 114 and 124 which allow the load cell 130 to tilt and reposition itself into an orientation which aligns it with the forces applied to the load cell assembly 30 thus rendering it insensitive to transversely and obliquely applied loads such that only vertical forces and thus the actual weight applied to an associated platform scale 10 is detected.

Secondly, it will be appreciated that the load cell 130 weighs in tension, not compression. This feature of the present invention further improves it performance with regard to vertical force sensitivity and transverse and oblique force insensitivity relative to scale mechanisms and load cell assemblies which weigh in compression.

Thirdly, it will be appreciated that the load cell assembly 30 according to the present invention is widely applicable to a variety of load, weight and force measuring applications which due to the size of the load carrying platform or simply due to the complexity of support or interconnecting mechanisms, may generate transverse or oblique forces and thus require a load cell assembly which is substantially insensitive to them.

Finally, the modular nature of the load cell assembly 30 according to the present invention provides numerous benefits with regard to installation, service and repair. It will be appreciated that a single configuration of the load cell assembly 30 may be utilized at all points in a platform scale 10 such as illustrated in FIG. 1. That is, the load cell assembly 30 may readily be used at terminal platform locations to support the ends of platforms as illustrated to the right in FIG. 2 or at intermediate locations of a platform scale 10 to support both ends of adjacent platforms as illustrated to the left in FIG. 2. Thus, a standardized load cell assembly 30 may be utilized in any and all locations of a platform scale 10, assuming proper support members such as the load beams 32 are utilized and positioned as described above.

The load cell assembly 30 is readily removed for inspection and service. As illustrated in FIGS. 1 and 2 and especially FIG. 3, the operating components of the load cell assembly 30 may be removed by supporting the platforms 14A, 14B or 14C and specifically the longitudinal I-beams 24 by any convenient means such as a hydraulic jack (not illustrated) to remove weight from the elongate upper member 116 of the second alignment assembly 90. Then, the upper member 116 may be rotated approximately ninety degrees such that the entire load cell assembly 30 may be lifted upwards between the load beams 32 by the handles 82. The entire stack of components illustrated in FIG. 4 may then be readily disassembled by removing the cotter pin 148 and unthreading the nut 144. At this time, the various components of the alignment assemblies 50 and 90 such as the pivot members 60, 64, 100 and 104 may be inspected and serviced if necessary. Reassembly of the load cell assembly 30 comprehends the above described steps taken in the reverse order.

The foregoing disclosure is the best mode devised by the inventors for practicing this invention. It is apparent, however, that apparatus incorporating modifications and variations will be obvious to one skilled in the art of vehicle and high capacity scales. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A load cell assembly for weighing, calibrating and similar applications comprising, in combination,
   a first alignment assembly having a first top member, a first intermediate member and a first bottom member, first pivot means disposed between said top member and said first intermediate member for permitting pivoting motion between said just recited members generally about a first axis, and second pivot means disposed between said first intermediate member and said first bottom member for permitting pivoting motion between said just recited members generally about a second axis normal to said first axis;

a second alignment assembly having a second top member, a second intermediate member and a second bottom member, third pivot means disposed between said second top member and said second intermediate member for permitting pivoting motion between said just recited members generally about a third axis and fourth pivot means disposed between said second intermediate member and said second bottom member for permitting pivoting motion between said just recited members generally about a fourth axis normal to said third axis, and a load cell extending from said first top member to said second bottom member.

2. The load cell assembly of claim 1 further including a weight receiving platform coupled to said second top member and means for supporting said first bottom member.

3. The load cell assembly of claim 1 wherein said first, second, third and fourth pivot means includes a pivot member having a curved surface.

4. The load cell assembly of claim 3 wherein said first and second pivot means are coupled to opposite faces of said first intermediate member and said third and fourth pivot means are coupled to opposite faces of said second intermediate member.

5. The load cell assembly of claim 1 wherein said first top member includes a groove of curved cross section for receiving said first pivot means, said first bottom member includes a groove of curved cross section for receiving said second pivot means, said second top member includes a groove of curved cross section for receiving said third pivot means, and said second bottom member includes a groove of curved cross section for receiving said fourth pivot means.

6. The load cell assembly of claim 1 wherein said first, second, third and fourth pivot means includes pivot members having curved surfaces of a first radius and grooves having curved cross sections of a second radius, said first and said second radii having a ratio of about 1 to 1.125.

7. The load cell assembly of claim 1 wherein said first intermediate member includes channels for receiving said first and second pivot means and said second intermediate member includes channels for receiving said third and fourth pivot means.

8. The load cell assembly of claim 1 further including a weight receiving platform having pairs of transversely disposed load carrying members generally adjacent each corner, said members of said just recited pairs disposed substantially in parallel and spaced apart a first distance less than the length of said second top member and platform end adjacent members of said pairs of load carrying members spaced apart said first distance when ends of two of said weight receiving platforms are juxtaposed and means for supporting said first bottom member of said load cell assembly.

9. A load cell assembly for use in vehicle and general purpose scales comprising, in combination,
a first alignment assembly having a first top plate, a first intermediate plate and a first bottom plate, first pivot means disposed between said first top plate and said intermediate plate and defining a first pivot axis and second pivot means disposed between said first intermediate plate and said first bottom plate and defining a second pivot axis normal to said first pivot axis, a second alignment assembly having a second top plate, a second intermediate plate and a second bottom plate, third pivot means disposed between said second top plate and said second intermediate plate and defining a third pivot axis and fourth pivot means disposed between said second intermediate plate and said second bottom plate and defining a fourth pivot axis normal to said third pivot axis, and a load cell coupled to and extending between said first top plate and said second bottom plate.

10. The load cell assembly of claim 9 further including a weight receiving platform coupled to said second top plate and means for supporting said first bottom plate.

11. The load cell assembly of claim 9 wherein said first, second, third and fourth pivot means includes a pivot plate having a curved surface.

12. The load cell assembly of claim 11 wherein said first and second pivot means are coupled to opposite faces of said first intermediate plate and said third and fourth pivot means are coupled to opposite faces of said second intermediate plate.

13. The load cell assembly of claim 9 wherein said first top plate includes a groove of curved cross section for receiving said first pivot means, said first bottom plate includes a groove of curved cross section for receiving said second pivot means, said second top plate includes a groove of curved cross section for receiving said third pivot means, and said second bottom plate includes a groove of curved cross section for receiving said fourth pivot means.

14. The load cell assembly of claim 9 wherein said first, second, third and fourth pivot means includes pivot plates having curved surfaces of a first radius and grooves having curved cross sections of a second radius, said first and said second radii having a ratio of about 1 to 1.125.

15. The load cell assembly of claim 9 wherein said first intermediate plate includes channels for receiving said first and second pivot means and said second intermediate plate includes channels for receiving said third and fourth pivot means.

16. The load cell assembly of claim 9 further including a weight receiving platform having pairs of transversely disposed load carrying beams generally adjacent each corner, said beams of said just recited pairs disposed substantially in parallel and spaced apart a first distance less than the length of said second top plate and platform end adjacent beams of said pairs of load carrying beams spaced apart said first distance when ends of two of said weight receiving platforms are juxtaposed and means for supporting said first bottom plate of said load cell assembly.

17. A scale for vehicle and general purpose weighing, comprising, in combination, at least one weight receiving platform,
a plurality of load cell assemblies disposed in supporting relationship with said platform, each of said load cell assemblies including,
a first alignment assembly having a first upper member, a first intermediate member and a first lower member, first pivot means disposed between said first upper member and said first intermediate member and defining a first pivot axis and second pivot means disposed between said first intermediate member and said first lower member and defining a second pivot axis normal to said first pivot axis, a second alignment assembly having a second upper member, a second intermediate member and a second lower member, third pivot means disposed between said second upper member and said second intermediate member and defining a third pivot axis and fourth pivot means disposed between said second intermediate member and said second lower member and defining a fourth pivot axis normal to said third pivot axis, and a load cell extending from said first upper member to said second lower member.

18. The scale of claim 17 wherein said platform is supported by said second upper members of said load cell assemblies.

19. The scale of claim 17 wherein said platform includes pairs of parallel load carrying beams disposed in corners thereof, said pairs of beams spaced apart a distance less than the length of said second upper member and one of said pair of beams spaced from the end of said platform by a distance equal to one-half of said length of said second upper member.

* * * * *